United States Patent [19]

Miyakawa

[11] 4,320,997
[45] Mar. 23, 1982

[54] SPINDLE HOLDER GUIDE MEMBER FOR MULTIPLE SPINDLE ATTACHMENT

[75] Inventor: Eiji Miyakawa, Tokyo, Japan

[73] Assignee: Miyakawa Industry Company, Limited, Gifu, Japan

[21] Appl. No.: 126,745

[22] Filed: Mar. 3, 1980

[30] Foreign Application Priority Data

Dec. 21, 1979 [JP] Japan .............................. 54-167094

[51] Int. Cl.³ ............................................. B23B 39/20
[52] U.S. Cl. .................................... 408/46; 33/181 R
[58] Field of Search ........................... 408/46, 53, 48; 74/665 GA; 33/181 R

[56] References Cited

U.S. PATENT DOCUMENTS 3,203,282 8/1965 Wilson .................................. 408/46

FOREIGN PATENT DOCUMENTS 639658 2/1979 U.S.S.R. ................................ 408/46

*Primary Examiner*—Z. R. Bilinsky
*Attorney, Agent, or Firm*—Jordan and Hamburg

[57] ABSTRACT

Disclosed is a guide member of a multiple spindle attachment employed in drilling and tapping machines, which guide member is adapted to guide a plurality of spindle holders that mount drills or taps, and comprises a guide member body fixed to a fitting flange of the multiple spindle attachment frame, a plurality of guide channels formed in the guide member body for guiding the spindle holders, and a disk-shaped positioning member for positioning each of the guided spindle holders. The guide member body is disposed such that its center is located on the central axis of the multiple spindle attachment frame when in the attached state, and each of the guide channels extend linearly outwardly in a radial direction about the center of the guide member body. The arrangement is such that the distances from the central axis of the multiple spindle attachment body to each of the drills or taps are set equally by abutting the inward end of each spindle holder against the outer peripheral surface of the positioning member which can be interchanged with another positioning member of a different diameter.

7 Claims, 7 Drawing Figures

SPINDLE HOLDER GUIDE MEMBER FOR MULTIPLE SPINDLE ATTACHMENT

FIELD OF THE INVENTION

This invention relates to a spindle holder guide member for a multiple spindle attachment employed in drilling and tapping machines, which guide member is for guiding a plurality of spindle holders when the spindle holders are positionally adjusted, the spindle holders mounting drills or taps.

OBJECTS OF THE INVENTION

It is an object of the present invention to provide a spindle holder guide member for a multiple spindle attachment, in which a plurality of spindle holders are attached to a multiple spindle attachment frame and serve to mount drills or taps, the guide member being adapted so as to set equally the distances from the drills or taps to the center of the attachment frame.

It is another object of the present invention to provide a spindle holder guide member for a multiple spindle attachment, which guide member is adapted such that, with the guide member body being attached to a multiple spindle attachment frame, the guide member will not shift in the diametric direction of the attachment frame.

It is still another object of the present invention to provide a spindle holder guide member for a multiple spindle attachment, which spindle holders can be attached to and detached from the guide member body, this being possible through a simple operation.

It is a further object of the present invention to provide a spindle holder guide member for a multiple spindle attachment, which guide member is adapted such that a positioning member can be exchanged for another positioning member of a different diameter in a simple manner.

These and other objects of the present invention as set forth in the appended claims will become apparent from the following description of a preferred embodiment, and numerous advantages not hereinafter mentioned will occur to those skilled in the art upon working the present invention.

DETAILED DESCRIPTION OF THE PREFERRED EMBODIMENTS

Figure 1:
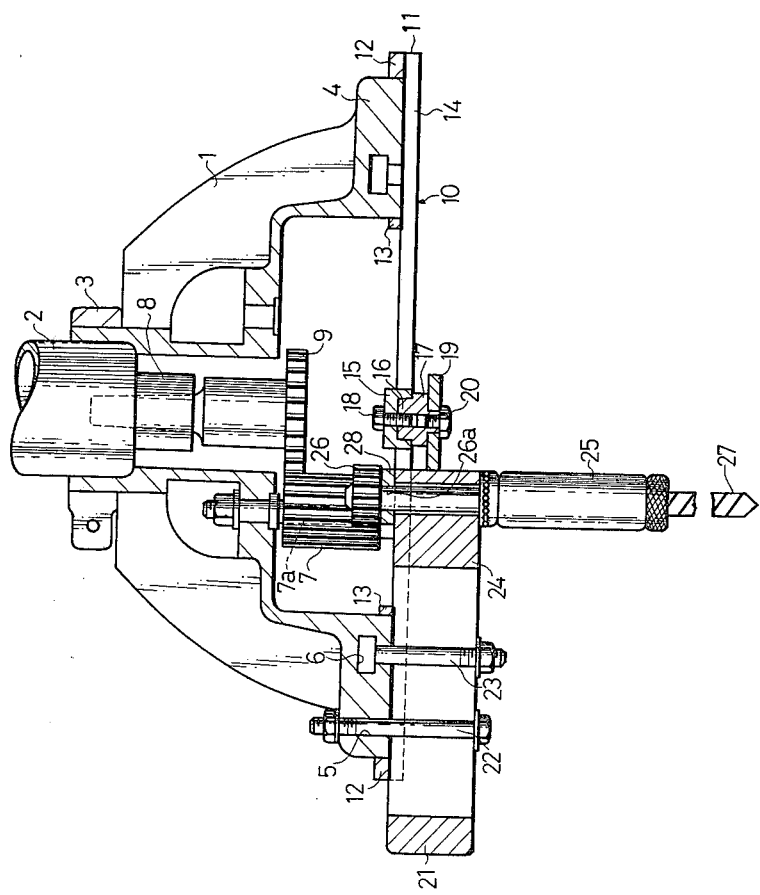
FIG. 1 is a partially deleted sectional view of a multiple spindle attachment frame, a guide member and a spindle holder, representing an embodiment of the present invention as applied to a multiple spindle attachment of a drilling machine.
Figure 2:
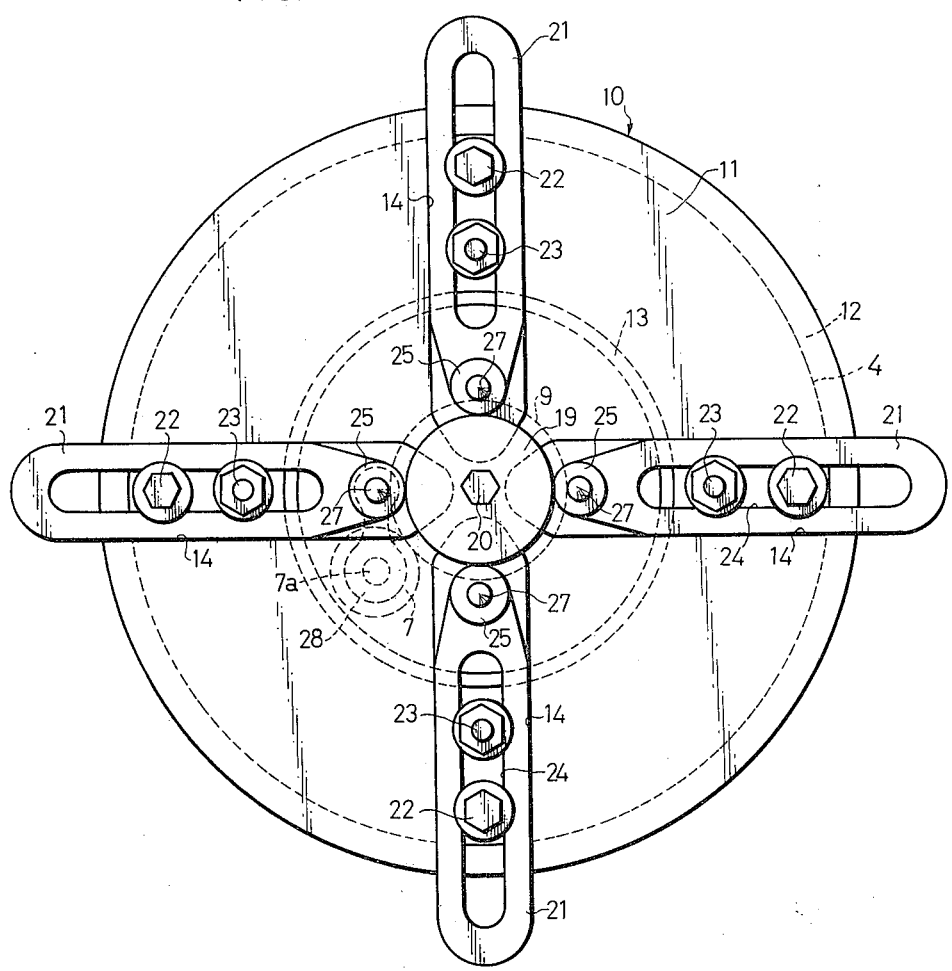
FIG. 2 is a bottom plan view of FIG. 1.

Reference will now be made to the accompanying drawings for a description of embodiments of the present invention as applied to a multiple spindle attachment of a drilling machine.

Illustrated in the drawings is an attachment frame 1 the upper end of which has a central portion to which is attached a clamping ring 3 fixedly clamped on a quill 2 of a drilling machine. The lower end portion of the attachment frame 1 is formed to include a ring-shaped fitting flange 4 having an outside portion which is provided with a suitable number (12 in the present embodiment) of equally spaced apart through-holes 5 for receiving bolts, and an inside portion which is provided with an annular T-slot 6 for supporting the heads of bolts 23 which support spindle holders 21 to be described later. Each bolt 23 is capable of being positionally adjusted in the circumferential direction along the T-slot 6. These bolts 23 are inserted from a passage (not shown), having a T-shaped cross-section, that communicates the outer peripheral surface of the fitting flange with the T-shaped groove 6.

Four intermediate gears 7 are supported inside the attachment frame 1 so as to mesh with a main shaft gear 9 fixedly mounted on a main shaft 8 of the drilling machine, and each intermediate gear 7 is adapted so as to be positionally adjustable along the outer periphery of the main shaft gear 9 while remaining in mesh therewith.

Figure 3:
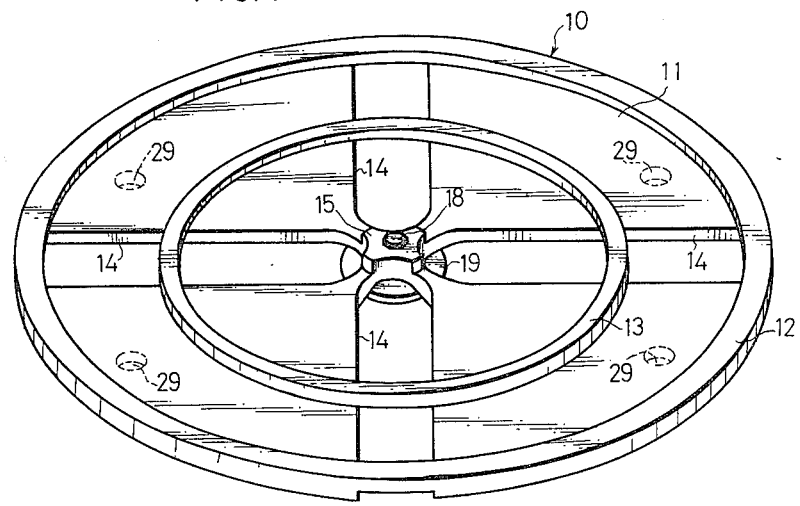
FIG. 3 is a perspective view of the guide member only.

Shown in FIG. 3 is a guide member 10 which is a unitary body comprising a disk-shaped guide member body or frame 11 and a pair of concentric annular projections 12, 13 which are formed on the upper face of the body 11 at the outer circumferential portion and at a portion closer to the inner circumference thereof. The guide member body 11 includes four equally spaced apart guide channels 14 that are cut into and through the guide member body and extend in a radiating manner. When the guide member 10 is attached to the fitting flange 4 of the attachment frame 1, the pair of annular projections 12, 13 fit over the inner and outer peripheries of the fitting flange such that they are rotatable with respect thereto.

Formed on the guide member frame 11 between the inner portions of the four guide channels 14 is a fitting portion 15 which projects from the same side of the guide member frame as the pair of annular projections 12, 13. A joining member 16 is inserted into the center of the fitting portion 15 from the bottom side and has an enlarged diameter portion 17 which protrudes downwardly from the fitting portion. A bolt 18 is inserted into the center of the fitting portion 15 from the topside and has a lower portion which is screwed into the joining member 16 to fix the joining member 16 to the fitting portion 15. A disk-shaped positioning member 19 is fixedly attached to the bottom face of the enlarged diameter portion 17 of the joining member 16 by means of a set screw 20 which is screwed into the joining member 16 from below the positioning member 19. This positioning member is adapted so as to be exchangeable with another of a different diameter.

Inserted into each guide channel 14 in the guide member 10 and positionally adjustable in the diametric direction thereof is a spindle holder 21. Each of these four spindle holders 21 is provided with a longitudinally extending oblong hole 24 through which are passed a locking bolt 22 that is passed through the through-hole 5, and the supporting bolt 23 which depends from the T-slot 6. Attached to the inner end of each spindle holder 21 is a spindle 25 having an upper end portion to which is fixedly secured a gear 26 that engages with a corresponding one of the intermediate gears 7, and a lower end portion to which a drill 27 is mounted. Located immediately below each intermediate gear 7 and each gear 26 and connected to their respective supporting shafts 7a, 26a so as to be rotatable with respect thereto is an arm 28 that serves to hold the gears 7, 26 in a suitable meshing state at all times in a suitable manner.

The multiple spindle attachment constructed as described above operates in the following manner.

When the main shaft 8 and main shaft gear 9 rotate, the turning effort is transmitted to each gear 26 through each corresponding intermediate gear 7 thereby to rotate the corresponding spindle 25 and, hence, the drill 27 which carries out a drilling operation.

When the centers of the four drills 27 are to be set at positions which are equal distances from the center of the attachment frame 1, each of the locking bolts 22 and supporting bolts 23 is loosened, and the spindle holders 21 together with their spindles 25, drills 27 and gears 26 are moved toward the center of the attachment frame along the corresponding guide channels 14 in the guide member 10 until the inner end face of each spindle holder 21 abuts against the outer peripheral surface of the positioning member 19. The bolts 22, 23 are then re-tightened. It should be noted that, when positionally adjusting the spindle holders 21 in the above fashion, the movement of each gear 26 is accompanied by movement of the corresponding intermediate gear 7 owing to the intermediary of the associated arm 28.

When changing the distance from the center of the attachment frame 1 to the drills 27, the set screw 20 is removed and the positioning member 19 is replaced by another of a different diameter. The inner end portion of each spindle holder 21 is then merely abutted against the outer periphery of the newly attached positioning member 19 in the same manner as described above. Thus, the positioning member 19 can be exchanged very easily since it is fixed only by the set screw 20.

Positioning each of the spindle holders 21, namely each of the drills 27, in the fashion described above allows each spindle holder to be positionally adjusted in the radial direction along the guide channels 14 in a simple manner and also enables the spindle holders 21 to be reliably held by the guide channels 14 without any lateral movement. In addition, the distances from the center of the attachment frame 1 to each drill 27 mounted on a respective spindle holder 21 can be set equally through a simple operation.

Figure 4:
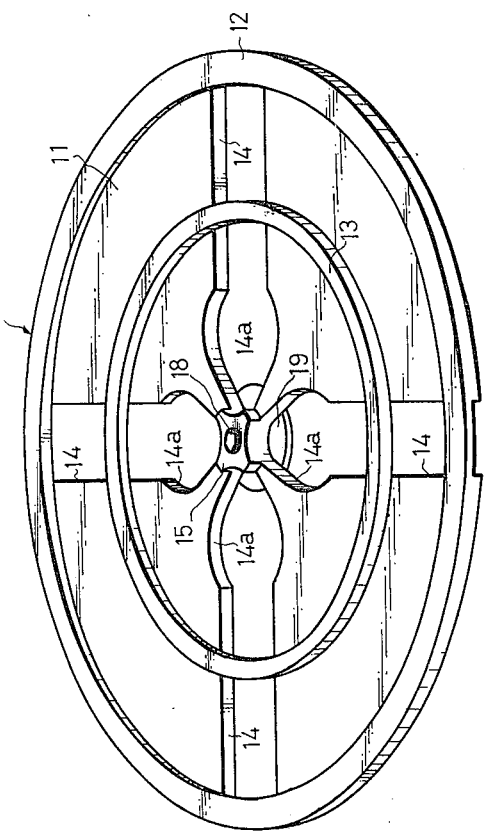
FIG. 4 is a perspective view of another example of a guide member.

It is possible to form a widened portion 14a, as illustrated in FIG. 4, at the inner end portion of each guide channel 14 described in the above embodiment. Such an arrangement facilitates the operation of passing the arm 28, which is mounted on the supporting shaft 26a of the gear 26, through the guide channel 14 of the guide member 10 when attaching the spindle holder 21 to and detaching it from the attachment frame 1.

Figure 5:
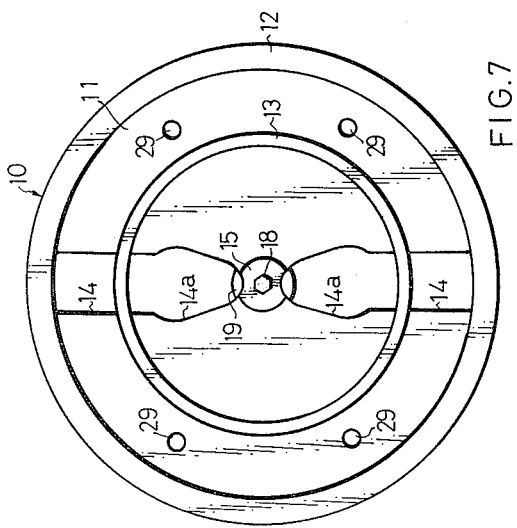
FIGS. 5 through 7 are plan views of further examples of guide members.
Figure 6:
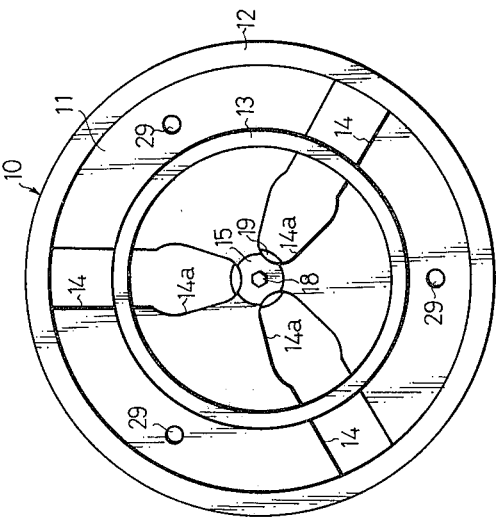
Figure 7:
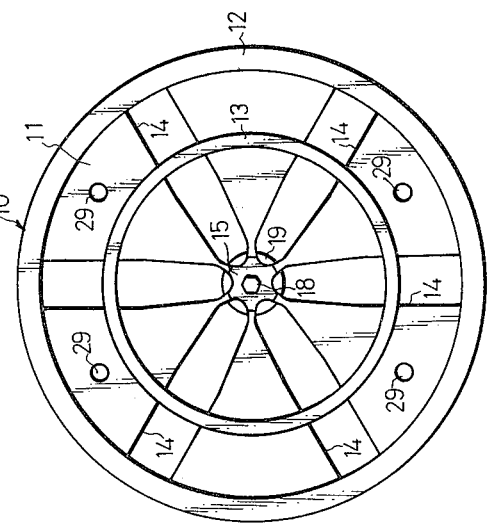

It is also possible to realize the present invention through the following modifications:

(A) The guide member 10 may, as shown in FIGS. 5 through 7, be formed to include two, three or six equally spaced apart guide channels 14.

(B) One or both of the pair of annular projections 12, 13 formed integral with the guide member 10 may be deleted.

(C) The guide channels 14 need not pass completely through the guide member body 11 but can be provided as recesses in the bottom face of the body 11. In such a case, the upper wall of each guide channel is provided with holes through which the locking bolts 22 and supporting bolts 23 are passed.

(D) The width of the guide channels may be changed.

(E) The guide member 10 may be provided with through-holes 29, as shown by the two-dot chain lines in FIG. 3, for receiving fitting bolts that are to be inserted into certain ones of the number of through-holes 5, in the side of the attachment frame 1, that do not receive the locking bolts 22. If the guide member 10 is secured to the attachment frame 1 by utilizing these through-holes 29, the guide member 10 can be held reliably in a fixedly secured state even when the locking bolts 22 and supporting bolts 23 which pass through the guide channels 14 are loosened to positionally adjust the spindles 25. It is therefore possible to position the spindles 25 both easily and accurately.

The present invention can also be applied to tapping machines as well as the above described drilling machine. In such a case the taps would be mounted on the spindle holders.

It goes without saying that the guide member 10 and positioning member 19 can be demounted from the attachment frame 1 when they are not in use.

As many apparently widely different embodiments of this invention may be made without departing from the spirit and scope thereof, it is to be understood that the invention is not limited to the specific embodiments thereof except as defined in the appended claims.

What is claimed is:

1. A guide member for spindle holders to be attached to a spindle frame of a multiple spindle head comprising,
    a guide member body detachably connected to the spindle frame of the spindle head, said guide member body having means to locate the body in the center of the spindle frame when the body is attached thereto,
    a plurality of guide channels formed in said guide member body, said guide channels radially outwardly extending substantially from the center of said guide member body directly into communication with the exterior of said guide member body, each guide channel having substantially the same width as that of the spindle holder attached to the spindle head so that the spindle holder can be moved along the guide channel, and
    a positioning member attached to the center of the exterior of said guide member body, said positioning member being interchangable with at least one other like positioning member of a different size, whereby when the spindle holders in the guide channels are moved to abut the positioning member, the spindle holders are set equally away from the center of the spindle head.

2. A guide member for spindle holders according to claim 1, in which said means to locate the guide member body in the center of the spindle frame comprises inner and outer annular projections coaxially located in the center of said guide member body to extend upwardly therefrom, the distance between the inner and outer annular projections being equal to the thickness of the lower end of the frame of the spindle head so that whenever the guide member body is attached to the spindle frame, the guide member body is always located exactly in the center of the spindle frame.

3. A guide member for spindle holders according to claim 2, in which said inner and outer annular projections are located above the spindle holders to be attached to the spindle frame so that said guide member body is supported and held in position by said spindle holders.

4. A multiple spindle head having a system to easily and precisely adjust the position of spindles located inside the spindle head comprising, a spindle frame having a clamping member at one side for detachably connecting the spindle frame to a quill of a drilling machine, and a spindle flange at the opposite side of the clamping member, a main gear rotationally situated in the center of the spindle frame, said main gear being connected to a main shaft of the drilling machine for rotation thereof, a plurality of intermediate gears in the spindle frame situated around the main gear to mesh therewith, said intermediate gears having gear shafts to move around the main gear to change relative positions in the frame, a plurality of spindle members, each having a spindle holder detachably and movably connected to said spindle flange, a spindle rotationally supported in said spindle holder, a spindle gear connected to said spindle to mesh with said predetermined intermediate gear, and an arm situated between the spindle and the gear shaft of the intermediate gear to set the distance therebetween so that when the spindle position is changed by moving the spindle holder, the spindle gear is always engaged with said intermediate gear, and a guide member for the spindle holders detachably connected to said spindle frame, said guide member including a guide member body having means to locate the body in the center of the spindle frame when the body is attached thereto, a plurality of guide channels formed in said guide body, said guide channels radially outwardly extending substantially from the center of said guide member body directly into communication with the exterior of the guide member body, each guide channel having the same width as that of the spindle holder so that the spindle holder can be moved along the guide channel, and a positioning member attached to the center of the exterior of said guide member body, said positioning member being interchangable with at least one other like positioning member of a different size, whereby when the spindle holders in the guide channels are moved to abut the positioning member, the spindle holders are set equally away from the center of the spindle head.

5. A multiple spindle head according to claim 4, in which said spindle holder of each spindle member includes an elongated hole therein extending substantially along the entire length of the holder, at least one bolt passing through said hole and engaging said flange of the spindle frame, so that the spindle holder can be firmly connected to said spindle frame by said bolt.

6. A multiple spindle head according to claim 4, in which said means to locate the guide member body in the center of the spindle frame comprises inner and outer annular projections coaxially located in the center of said guide member body to extend upwardly therefrom, the distance between the inner and outer annular projections being equal to the thickness of the lower end of the frame of the spindle head so that whenever the guide member body is attached to the spindle frame, the guide member body is always located exactly in the center of the spindle frame.

7. A multiple spindle head according to claim 6, in which said inner and outer annular projections are located above the spindle holders to be attached to the spindle frame so that said guide member body is supported and held in position by said spindle holders.

* * * * *